United States Patent
Kunitomi et al.

(10) Patent No.: US 12,020,007 B2
(45) Date of Patent: Jun. 25, 2024

(54) AUTO-WRAPPERING TOOLS WITH GUIDANCE FROM EXEMPLAR COMMANDS

(71) Applicant: INTERNATIONAL BUSINESS MACHINES CORPORATION, Armonk, NY (US)

(72) Inventors: Mark Kunitomi, San Francisco, CA (US); David Chambliss, Morgan Hill, CA (US); Forest Dussault, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 17/932,661

(22) Filed: Sep. 15, 2022

(65) Prior Publication Data

US 2024/0094996 A1    Mar. 21, 2024

(51) Int. Cl.
    *G06F 9/44* (2018.01)
    *G06F 8/36* (2018.01)
    *G06F 8/41* (2018.01)
    *G06F 9/455* (2018.01)

(52) U.S. Cl.
    CPC .............. *G06F 8/41* (2013.01); *G06F 8/36* (2013.01); *G06F 8/427* (2013.01); *G06F 9/45512* (2013.01)

(58) Field of Classification Search
    None
    See application file for complete search history.

(56) References Cited

U.S. PATENT DOCUMENTS

| | | | |
|---|---|---|---|
| 7,440,837 B2 | 10/2008 | Kulzer et al. | |
| 10,348,702 B1 | 7/2019 | Sundaram et al. | |
| 10,409,558 B2 | 9/2019 | Kumar | |
| 10,423,612 B2 | 9/2019 | Liensberger et al. | |
| 10,649,986 B2 | 5/2020 | Wong et al. | |
| 2004/0010781 A1 | 1/2004 | Maly et al. | |
| 2005/0060693 A1 | 3/2005 | Robison et al. | |
| 2008/0209316 A1* | 8/2008 | Zandstra | G06F 8/00 715/700 |

(Continued)

FOREIGN PATENT DOCUMENTS

| | | |
|---|---|---|
| CN | 102612687 A | 7/2012 |
| CN | 108292206 A | 7/2018 |

(Continued)

OTHER PUBLICATIONS

International Search Report and Written Opinion dated Nov. 21, 2023 in related application No. PCT/CN2023/11742, 8 pgs.

*Primary Examiner* — Insun Kang
(74) *Attorney, Agent, or Firm* — Intelletek Law Group, PLLC; Gabriel Daniel, Esq.

(57) ABSTRACT

Information received from a graphical user interface (GUI) and a list of user-curated command line patterns are received by an auto-wrapper system, wherein the auto-wrapper system is associated with an analytics workflow service. A module including a parameter space having one or more parameters and options used in the list of user-curated command line patterns is generated, by the auto-wrapper system, wherein content for each parameter is derived from the parameter's presence in the list of user-curated command line patterns combined with the information received from a GUI.

17 Claims, 6 Drawing Sheets

(56) References Cited

U.S. PATENT DOCUMENTS

| | | | | |
|---|---|---|---|---|
| 2009/0172541 | A1* | 7/2009 | Acedo | G06F 3/048 |
| | | | | 715/708 |
| 2012/0150939 | A1* | 6/2012 | Zaifman | G06F 9/45512 |
| | | | | 715/744 |
| 2014/0379784 | A1 | 12/2014 | Swedor et al. | |
| 2018/0357051 | A1 | 12/2018 | Puszkiewicz | |
| 2021/0342654 | A1* | 11/2021 | Garg | G06F 9/45512 |
| 2023/0259377 | A1* | 8/2023 | Qian | G06F 9/453 |
| | | | | 715/708 |

FOREIGN PATENT DOCUMENTS

| | | | |
|---|---|---|---|
| CN | 108614776 | A | 10/2018 |
| JP | 2000047985 | A | 2/2000 |
| WO | 2012/135931 | A1 | 10/2012 |
| WO | 2017082813 | A1 | 5/2017 |

\* cited by examiner

AUTO-WRAPPERING TOOLS WITH GUIDANCE FROM EXEMPLAR COMMANDS

BACKGROUND

Technical Field

The present disclosure generally relates to analytics workflow services, and more particularly, to systems and methods of automatically wrapping code for execution by the analytics workflow services.

Description of the Related Art

Many open-source code bases or pieces of software are available to users, the bulk of which are executable only via a command line interface. There exists no standard or basic usage requirements for these code bases, thereby causing a cumbersome and confusing interaction when invoked by various users. The speed of execution to execute these code bases is therefore significantly slowed down by the incompatibility of different systems, and use of customized language and parameter description and definitions.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One embodiment includes a computer implemented method. The computer implemented method also includes receiving, by an auto-wrapper system, information received from a GUI and a list of user-curated command line patterns, where the auto-wrapper system is associated with an analytics workflow service; and generating, by the auto-wrapper system, a module including a parameter space having one or more parameters and options used in the list of user-curated command line patterns, where content for each parameter is derived from the parameter's presence in the list of user-curated command line patterns combined with the information received from a GUI. Other embodiments of this aspect include corresponding computer systems, apparatus, and computer programs recorded on one or more computer storage devices, each configured to perform the actions of the methods. By virtue of the teachings herein, the speed of execution of command line code, and it's auto-wrappering therein, is improved.

The method may include: translating, by the auto-wrapper system, each command-line pattern of the list of user-curated command line patterns into an example snippet in a language of the analytics workflow service that invokes the module in such a way as to reproduce the command-line pattern. The example snippet incorporates documentation content of the information received from a GUI for easy review. Content for each parameter includes a short tag, a display label, a description, an enrichment documentation, a type, an insertion pattern, a default value, and an optionality. The auto-wrapper system starts by parsing each command-line pattern of the list of user-curated command line patterns into a command with parameter/option/value expressions, where the results of parsing are tentative, because different parsing approaches might yield different meanings. The auto-wrapper system analyzes the information received from a GUI into an index associating parameter and/or option symbols with associated content like type and description, where an initial parsing of the list of user-curated command line patterns generates a set of information used to set parameters for analyzing the list of user-curated command line patterns. The auto-wrapper system resolves each parameter/option/value expression against the index, where resolving includes revising a parsing result, by restructuring one expression, or combining two expressions into one, or splitting one into two, according to what is found in the index. The method may include: translating, by the auto-wrapper system, each command-line pattern of the list of user-curated command line patterns into an example snippet in a language of the analytics workflow service that invokes the module in such a way as to reproduce the command-line pattern.

In one embodiment, content for each parameter includes: a short tag, a display label, a description, an enrichment documentation, a type, an insertion pattern, a default value, and an optionality. The auto-wrapper system starts by parsing each command-line pattern of the list of user-curated command line patterns into a command with parameter/option/value expressions, where the results of parsing are tentative, because different parsing approaches might yield different meanings. The auto-wrapper system analyzes the information received from a GUI into an index associating parameter and/or option symbols with associated content like type and description, where an initial parsing of the list of user-curated command line patterns generates a set of information used to set parameters for analyzing the list of user-curated command line patterns. The auto-wrapper system resolves each parameter, option, and value expression against the index, where resolving includes revising a parsing result, by restructuring one expression, or combining two expressions into one, or splitting one into two, according to what is found in the index. Implementations of the described techniques may include hardware, a method or process, or computer software on a computer-accessible medium.

One embodiment includes a non-transitory computer readable storage medium tangibly embodying a computer readable program code having computer readable instructions that. The non-transitory computer readable storage medium also includes receiving, by an auto-wrapper system, a information received from a GUI and a list of user-curated command line patterns, where the auto-wrapper system is associated with an analytics workflow service; and generating, by the auto-wrapper system, a module including a parameter space having one or more parameters and options used in the list of user-curated command line patterns, where content for each parameter is derived from the parameter's presence in the list of user-curated command line patterns combined with the information received from a GUI. Other embodiments of this aspect include corresponding computer systems, apparatus, and computer programs recorded on one or more computer storage devices, each configured to perform the actions of the methods.

In one embodiment, the example snippet incorporates documentation content of the information received from a GUI for easy review. Implementations of the described techniques may include hardware, a method or process, or computer software on a computer-accessible medium.

One embodiment includes a computing device including a processor, and a network interface coupled to the processor to enable communication over a network. A storage device is coupled to the processor. An auto-wrappering engine is stored in the storage device, where an execution of the auto-wrappering engine by the processor configures the computing device to perform acts including receiving, by the computing device, information received from a GUI and a list of user-curated command line patterns, where the computing device is associated with an analytics workflow service; and generating, by the computing device, a module including a parameter space having one or more parameters and options used in the list of user-curated command line patterns, where content for each parameter is derived from the parameter's presence in the list of user-curated command line patterns combined with the information received from a GUI. Other embodiments of this aspect include corresponding computer systems, apparatus, and computer programs recorded on one or more computer storage devices, each configured to perform the actions of the methods.

In one embodiment, execution of the auto-wrappering engine by the processor further configures the computing device to perform the act of translating, by the computing device, each command-line pattern of the list of user-curated command line patterns into an example snippet in a language of the analytics workflow service that invokes the module in such a way as to reproduce the command-line pattern. The example snippet incorporates documentation content of the information received from a GUI for easy review. The computing device starts by parsing each command-line pattern of the list of user-curated command line patterns into a command with parameter, option, and value expressions, where the results of parsing are tentative, because different parsing approaches might yield different meanings. The computing device analyzes the information received from a GUI into an index associating parameter and/or option symbols with associated content like type and description, where an initial parsing of the list of user-curated command line patterns generates a set of information used to set parameters for analyzing the list of user-curated command line patterns. The computing device resolves each parameter, option and value expression against the index, where resolving includes revising a parsing result, by restructuring one expression, or combining two expressions into one, or splitting one into two, according to what is found in the index. Implementations of the described techniques may include hardware, a method or process, or computer software on a computer-accessible medium.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
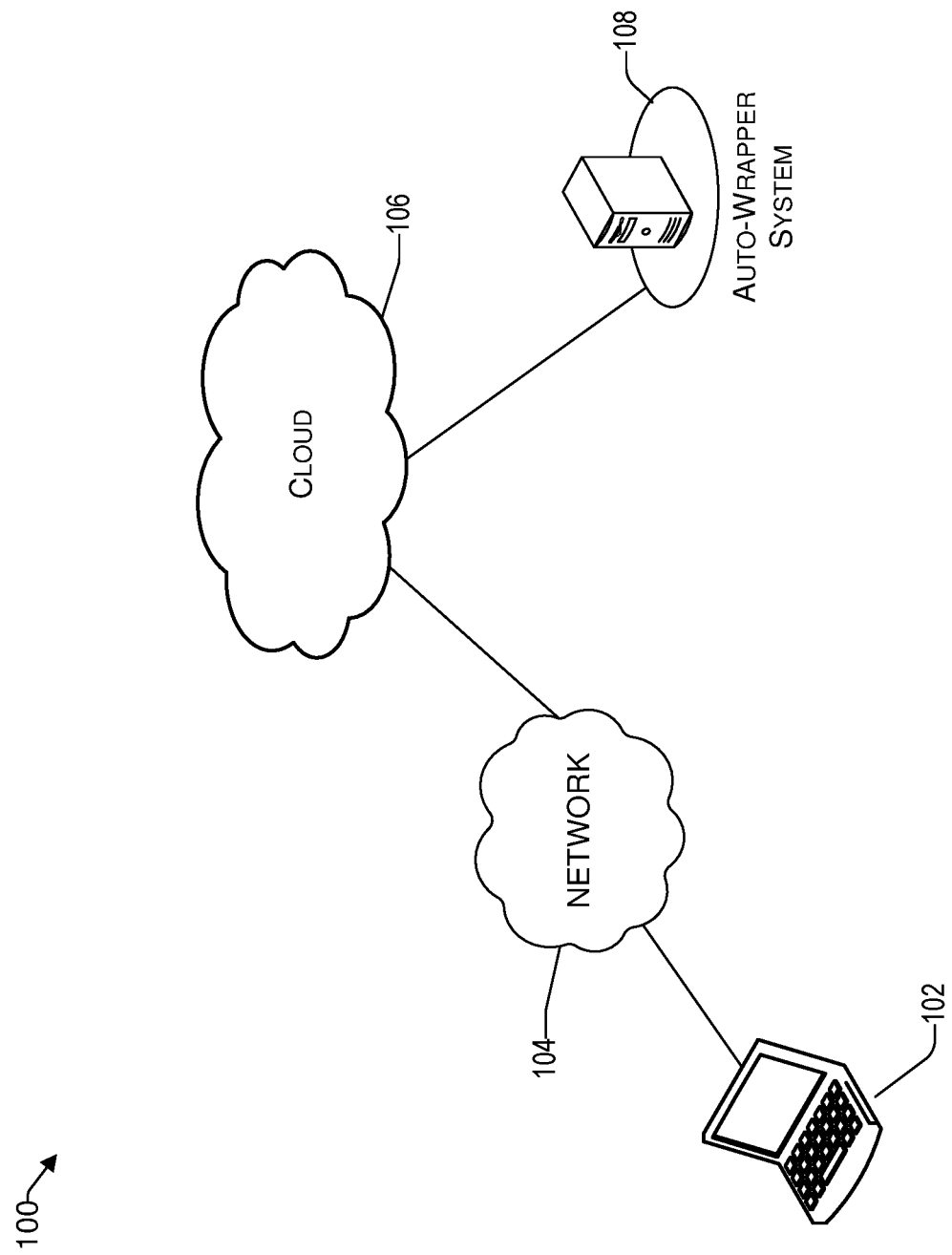
FIG. 1 illustrates an example architecture for implementing an auto-wrapper system according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of a cloud-based system or web portal where a user identifies a software tool for wrapping. The user inputs a specification of the environment needed to execute the tool. The specification may be a containerized image, or a string that identifies a container image that may be obtained from a storage location or from a third party. Following the input of the specification of the environment, the user may input one or more series of texts or a command line invocation used normally to run the software tool in the specified environment. The text is read in, and parsed using one or more heuristics into its call and parameters and generates an initial version of a module for using the tool. The module for a given tool includes a data record containing the specification of the environment, data records specifying the parameters available for use with the tools, and records specifying how command lines should be generated in the future to execute the software tool. The system generates one or more GUI's which allow the user to modify the values, types, descriptions, flags and other details of the command line invocation instructions contained in the module. Based on the input retrieved from the GUI's, an index is generated which is used to create the final version of the module, which is supplied into an analytics workflow service.

The module thus created is used in the analytics workflow service to execute the software tool one or more times. The analytics workflow service may have a library of many modules, produced either by the operation of various embodiments or by other means. The analytics workflow service operates to orchestrate the execution of modules in accordance with instructions provided by users. The module content derived in the wrapping process is used to guide users of the analytics workflow service about how to use the module appropriately. The module content is also used to set up the required execution environment and formulate the execution command line for each time the tool needs to be executed. A given tool may be run many thousands of times.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. The work done by the software tools cannot be done by a human user because of the volume of processing that is involved. The work done by the analytics workflow system to generate the command lines for each time a tool module is invoked cannot reasonable be done manually by a human user because there are too many such invocations, the invocations may arise at any time of day or night, and they must be done without error. The work done by the auto-wrapper system cannot be done by a human user of ordinary skill because the information in the module must precisely match the complex requirements of the analytics workflow system, so an ordinary user would generally fail to create a successful result.

Example Architecture

To better understand the features of the present disclosure, it may be helpful to discuss known architectures. To that end, FIG. 1 illustrates an example architecture 100 for implementing an auto-wrapper system. Architecture 100 includes a network 104 that allows one or more user devices, such as user device 102 to communicate with one or more clouds such as cloud 106, as well as other elements that are connected to the network 104, like auto-wrapper system 108.

The network 104 may be, without limitation, a local area network (LAN), a virtual private network (VPN), a cellular network, the Internet, or a combination thereof. For example, the network 104 may include a mobile network that is communicatively coupled to a private network, sometimes referred to as an intranet that provides various ancillary services, such as communication with various application stores, libraries, and the Internet. The network 104 allows the auto-wrapper system 108, to receive data from the user device 102, parse it and present a Graphical User Interface (GUI) to the use rfor selection, modification and updating of the data for automatic generation of a module that is associated with an analytics workflow service. A module generated for this may also be described as a code wrapper of the tool. An analytics workflow service can exist without having an auto-wrapper system, and some are present in prior art. Two examples are online services which offer access via web browser applications. In those systems, the modules (or code wrappers) are represented as files written in programming languages such as the Common Workflow Language (CWL) or the Workflow Definition Language (WDL). Such modules may be created by programmers with special skill. An embodiment of the invention may be created using one of those services, by constructing the auto-wrapper system to generate its results as CWL or WDL.

For purposes of later discussion, one user device appears in the drawing, to represent some examples of the computing devices that may be the source of container images, user-curated command line patterns and information received from a GUI. Today, user devices typically take the form of laptops, desktops, smart-phones, tablet computers, although they may be implemented in other form factors, including consumer, and business electronic devices and servers.

Figure 2:
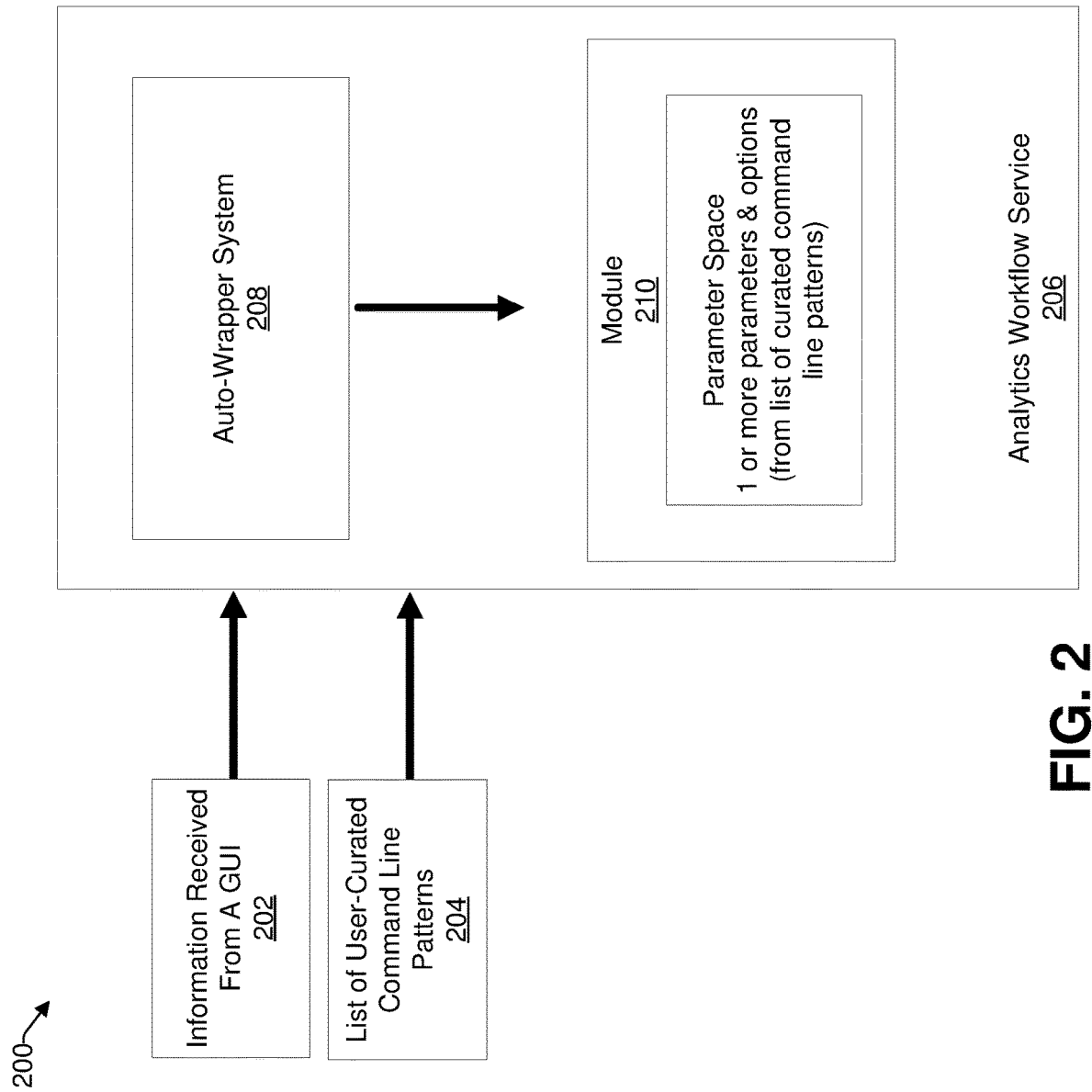
FIG. 2 illustrates a system diagram according to an embodiment.

FIG. 2 illustrates a system 200 diagram according to an embodiment. System 200 may be an implementation of auto-wrapper system 108. System 200 may include receiving information received from a GUI 202 and one or more list(s) of user-curated command line patterns 204 as inputs to auto-wrapper system 208. Auto-wrapper system 208 may be a part of the analytics workflow service 206.

Auto-wrapper system 208 may generate an index based on the information received from a GUI 202. Based on the index and parsing results from the list of user-curated command line patterns 204, the auto-wrapper system 208 may generate a parameter space, including one or more parameters and options in module 210. The auto-wrapper system 208 may translate the module contents so that they are in a language of the analytics workflow service.

Figure 3:
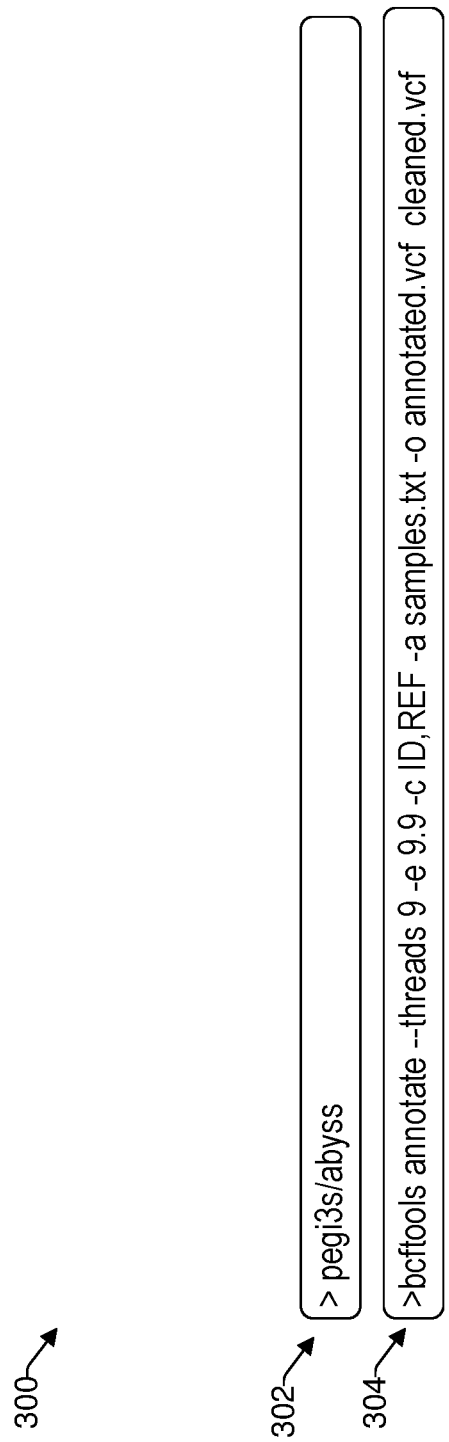
FIG. 3 illustrates a command line user interface according to an embodiment.

FIG. 3 illustrates a command line user interface 300 according to an embodiment. Command line user interface 300 may include command line 302 and/or command line 304. Command line 302 may be where a user inputs the location of where one or more container images are located. Command line 304 may then be used as a command line where the user indicates the invocation string along with their own parameters or values which are parsed by the Auto-wrapper system 108. As illustrated, the command bcftools may be used to call Variant Call Format (VCF) files, which can be used in bioinformatics for storing gene sequence variations.

Figure 4:
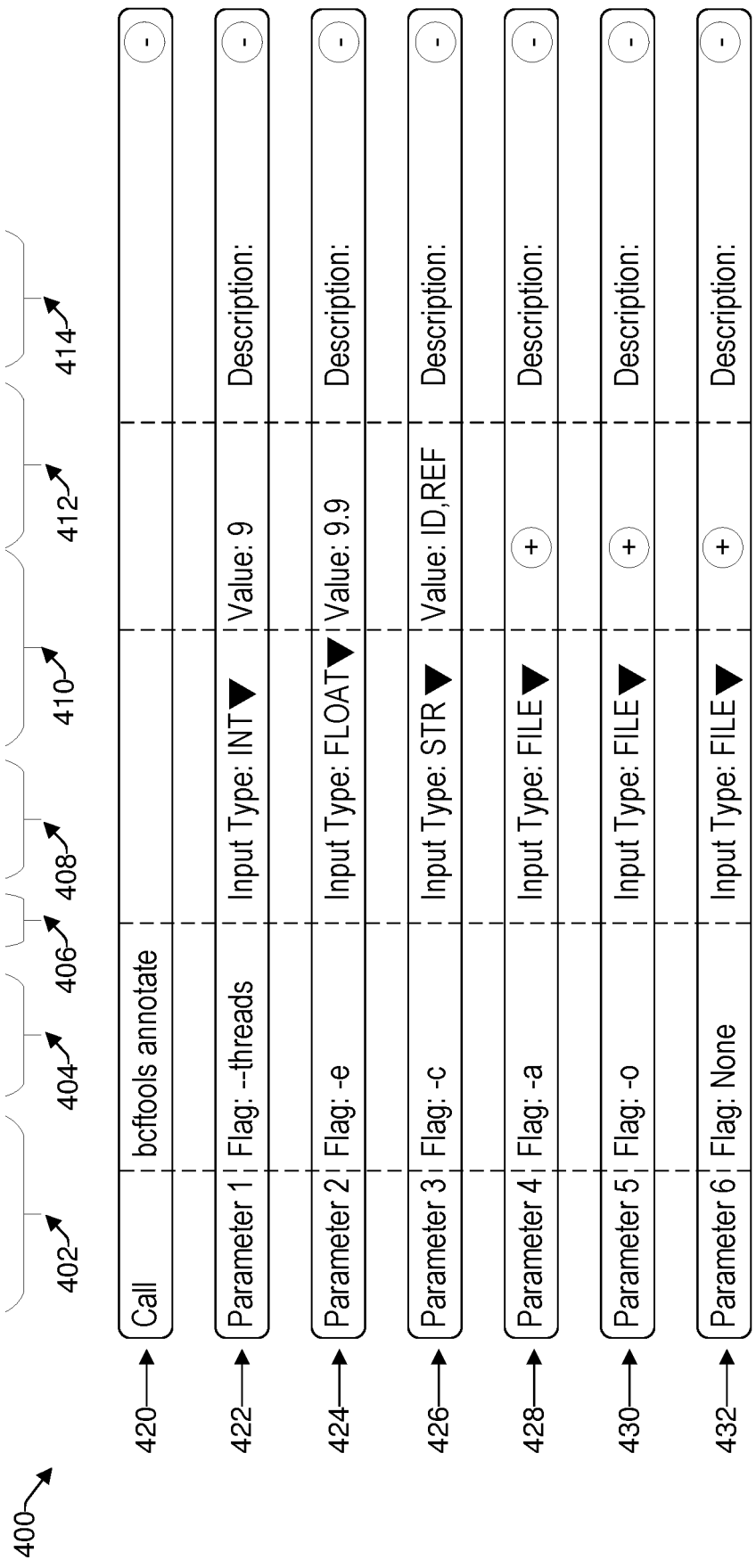
FIG. 4 illustrates a graphical user interface according to an embodiment.

FIG. 4 illustrates a graphical user interface (GUI 400) according to an embodiment. GUI 400 may include one or more GUI lines such as GUI lines 420-432 representing each parameter, call etc. As illustrated, GUI line 420 indicates that parsed command line segment 402 was parsed and detected as a Call with "bcftools annotate" as the phrase to be passed into the call. GUI line 422 indicates that parsed command line segment 404 was detected as a parameter (namely Parameter 1) with - -threads as a flag and a value of 9 set as an integer. The user in this case can change the Input Type via a dropdown, modify the flag, modify the value, or add a description. Similarly, the user may remove the line or parameter entirely by pressing the circled dash on the right of GUI line 420.

GUI line 424 indicates that parsed command line segment 406 was detected as a parameter (namely Parameter 2) with -e as a flag and a value of 9.9 set as a float. GUI line 426 indicates that parsed command line segment 408 was detected as a parameter (namely Parameter 3) with -c as a flag and a value of ID, REF set as a string. GUI line 428 indicates that parsed command line segment 410 was detected as a parameter (namely Parameter 4) with -a as a flag with an input FILE type with an option to add values by clicking, for example a circled +. GUI line 430 indicates that parsed command line segment 412 was detected as a parameter (namely Parameter 5) with -o as a flag with an input FILE type with an option to add values. GUI line 432 indicates that parsed command line segment 414 was detected as a parameter (namely Parameter 6) with no flags and an input FILE type with an option to add values and a description.

When amending the information received from a GUI of GUI 400, the user may choose to revise any of the one or more results which are populated. The user may restructure one or more of the expressions, combine two expressions into one, or split one expression into two, for example. Descriptions may be added to any of GUI lines 420-432. The data Input Type may be changed for one or more of the lines. The value may be amended as well as the flags and/or parameters. Any change within the scope of scripting and coding used by the analytics workflow service may be considered.

One example of a parsing procedure according to an embodiment includes:

Parsing the elements by spaces.

Examining the elements in order to find the first element that starts with a dash ("-") or contains an extension (for example, ".txt", ".vcf", etc). The previous elements are then defined as the call.

For the first element that starts with a dash ("-") or contains an extension (e.g. ".txt", ".vcf", etc) the following may occur:

a. When the element begins with a dash ("-"):
  i. When the following element also begin with a dash ("-"): a new parameter is defined as a boolean flag. Otherwise,
  ii. When the following element can be represented as an integer: a new parameter is created with the flag defined as the dashed element, the input type defined as integer, and the value defined as the following element. Otherwise,
  iii. When the following element can be represented as a float: a new parameter is created with the flag defined as the dashed element, the input type defined as float, and the value defined as the following element. Otherwise,
  iv. When the following element is identified as containing an extension: a new parameter is created with the flag defined as the dashed element, the input type defined as file, and the value defined as the following element. Otherwise,
  v. When the following element can be represented as a string: a new parameter is created with the flag defined as the dashed element, the input type defined as a string, and the value defined as the following element.

b. When the element contains an extension (for example, ".txt", ".vcf", etc): a new parameter may be defined as a positional file with no flag.

The auto-wrapper system 108 may proceed to the next element that is not part of a parameter definition.

Once the auto-wrapper system 108 assigns the elements to a parameter or call, these definitions are presented to the user graphically like in GUI 400.

The user may then change any parameters definition.

Upon confirmation by the user, the auto-wrapper system 108 generates code for each parameter and the call.

In one complete example:
bcftools annotate - -threads 9-e9.9-c ID,REF-a samples.txt-o annotated.vcf cleaned.vcf 1) The auto-wrapper system 108 parses the elements by spaces (|indicating spaces found):
bcftools|annotate|- -threads|9|-e9.9|-c|ID,REF|-a|samples.txt|-o|annotated.vcf|cleaned.vcf 2) The auto-wrapper system 108 finds the first element that starts with a dash ("–") or contains an extension:
bcftools|annotate|- -threads|9|-e9.9|-c|ID,REF|-a|samples.txt|-o|annotated.vcf|cleaned.vcf
The Call is defined as "bcftools annotate"

3) The element begins with a dash and the following element is a valid integer:
bcftools|annotate|- -threads|9|-e9.9|-c|ID,REF|-a|samples.txt|-o|annotated.vcf|cleaned.vcf
A new parameter is created (parameter 1) with the flag "--threads", type "integer', and a value of "9".

4) The next element that begins with a dash and the following element is a valid float is found:
bcftools|annotate|- - -threads|9|-e9.9|-c|ID,REF|-a|samples.txt|-o|annotated.vcf|cleaned.vcf
A new parameter is created (parameter 2) with the flag "-e", type "float, and value of "9.9".

5) The next element begins with a dash and the following element is a valid string is found:
bcftools|annotate|- -threads|9|-e9.9|-c|ID,REF|-a|samples.txt|-o|annotated.vcf|cleaned.vcf A new parameter is created (parameter 3) with the flag "-c", type "string", and value of "ID,REF"

6) The next element begins with a dash and the following element has an extension is found:
bcftools|annotate|- -threads|9|-e9.9|-c|ID,REF|-a|samples.txt|-o|annotated.vcf|cleaned.vcf
A new parameter is created (parameter 4) with the flag "-a", type "file", and value of "samples.txt"

7) The next element begins with a dash and the following element has an extension is found:
bcftools|annotate|- -threads|9|-e9.9|-c|ID,REF|-a|samples.txt|-o|annotated.vcf|cleaned.vcf
A new parameter is created (parameter 5) with the flag "-o", type "file", and value of "annotated.vcf"

8) The next element has an extension is found:
bcftools|annotate|- -threads|9|-e9.9|-c|ID,REF|-a|samples.txt|-o|annotated.vcf|cleaned.vcf
A new parameter is created (parameter 6) with no flag, type "file", and value of "cleaned.vcf". At this point, the elements have been defined by the auto-wrapper system 108.

After the draft above is created by auto-wrappering, the user may modify what has been determined, via the presented UI. The user might designate that the "-o" parameter, for example, has type "string" (or possibly "output_path") because it does not supply an existing file, but provides the location where a file should be created. The user might also provide description of what some or all parameters mean, and designate some parameters as optional.

The descriptions above illustrate the processing of a single exemplar command line. When a user supplies multiple example command lines it is possible to generate results that are more accurate. When multiple example commands are provided, each one is parsed as described above, creating its own parameter space. Then these parameter spaces are merged using a reconciliation heuristic. Two parameter spaces may be merged by, first, associating their parameters in pairs according to their names, for named parameters, and according to their positions for positional parameters. Second, parameter discrepancies that represent a parse conflict are reconciled. This occurs when one parameter space has a named parameter as a flag and the other has it as a non-flag parameter which takes a value. Then the other parameter space is regarded as mis-parsed, and it is altered to replace the non-flag parameter with a flag parameter plus a positional parameter. Since this changes the position numbers of positional parameters, the first step of associating parameters is redone.

After parse conflicts have been reconciled, the type conflicts are resolved, by selecting a less restrictive type as needed. Thus, a parameter seen as INT in one example but as FLOAT in the other would be regarded as FLOAT because an integer value is valid for FLOAT. Next is to mark as optional those parameters that are not found in both parameter spaces.

When more than two examples are provided, they are merged pairwise until one parameter space has been created from the collection. It is understood that many different strategies for parsing one or many example commands may be selected as embodiments of the invention.

Figure 5:
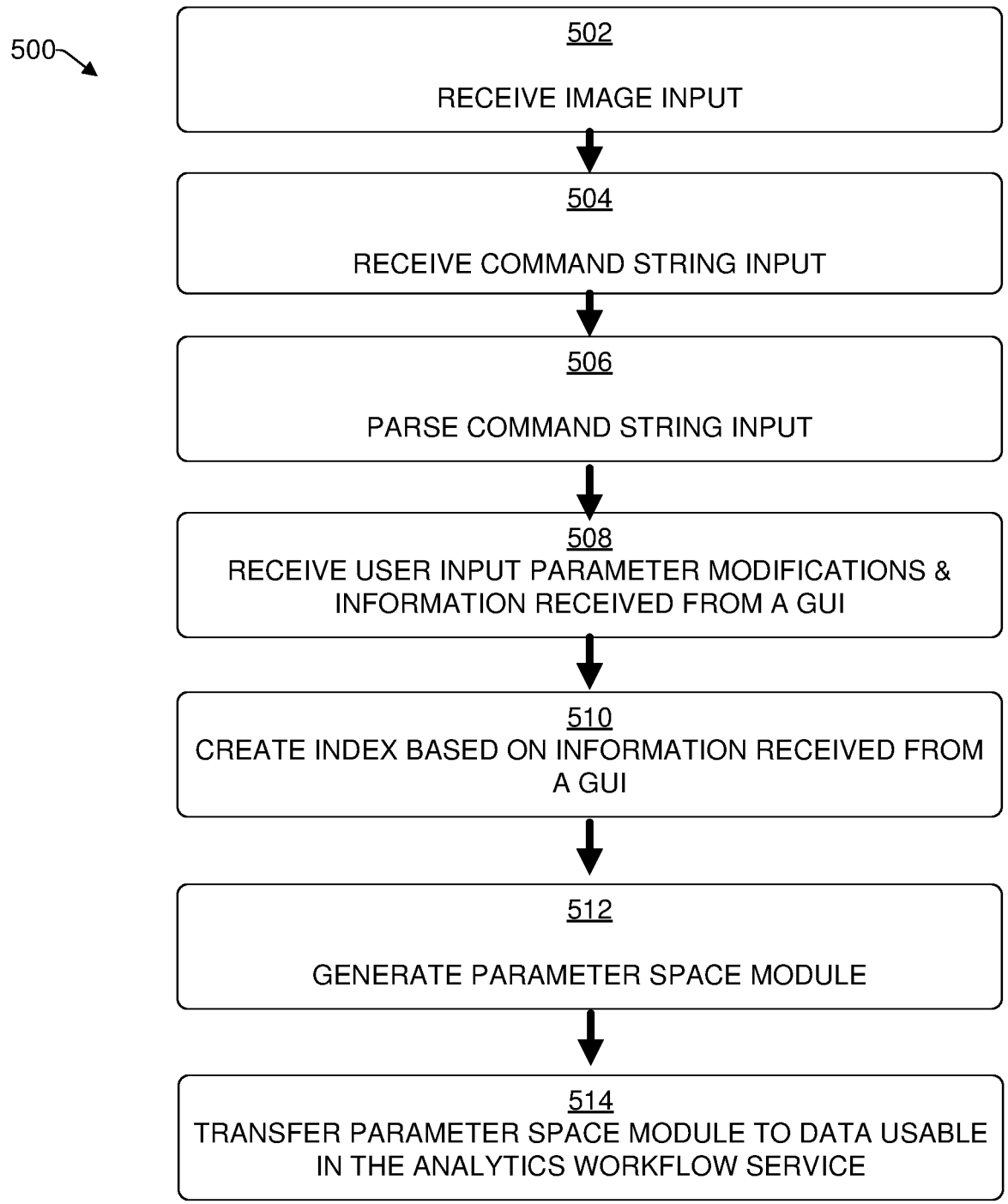
FIG. 5 illustrates a flow chart of a method used by the auto-wrappering system according to an embodiment.

FIG. 5 illustrates a flow chart 500 of a method used by the auto-wrappering system according to an embodiment. Auto-wrapper system 108 may begin in block 502 where it receives input such as a containerized program like a Docker™ image. A containerized program may relate to any source code which includes its libraries and dependencies needed to run the code on any infrastructure. The salient configuration files, libraries and dependencies may be packaged with the code so it can be run on the cloud. In some embodiments, the containerized image may be indicated by a user on command line 302. Auto-wrapper system 108 may move to block 504 where it receives the command string input from command line 304.

In block 504 the Auto-wrapper system 108 may receive one or more commands with any variation on parameters, their values and associated properties. For example, the parameter may include one or more short tags, display labels, descriptions, enrichment documentations, types, insertion patterns, default values, etc. Similarly, the command string input may include one or more commands with parameters, options, and/or value expressions. The Auto-wrapper system 108 may then move to block 506 where it may parse the command string input.

In block 506 the Auto-wrapper system 108 may parse the command string input according to one or more heuristics and one or more algorithms. For example, a dash or double dash may indicate to the system that there is a start of a parameter. The parameter's title or name may then follow the dashes in one example. In this example, what follows a blank space may then be the value of the parameter(s). The actual value may indicate to the system what value type is associated with the parameter. For example, if it is a floating point value, the Float type may be the default set for that parameter. Similarly, if an integer is the value that is parsed, then INT type may be the default. When a string or character is detected then a STR or CHAR may be set as the default. When a period or extension is detected, it also may mean that a file is being indicated. The auto-wrapper system 108 may then move to block 508.

In block 508, the auto-wrapper system 108 may present the user with one or more Graphical User Interfaces such as GUI 400. In one example, the user may be presented with a graphical line for each parsed or detected command and parameter/value combination. The auto-wrapper system 108 may translate each command-line pattern of the list of user curated command line patterns into one or more example snippets, in a language of the analytics workflow service, so as to reproduce the command-line pattern.

The user may make any modifications to the information received from a GUI, such as GUI 400, including changing the values, the input types, adding/modifying the descriptions, removing lines, adding lines, updating parameters, and/or changing the calls, for example. In one example, the user may change GUI line 424 by correcting the Input Type to be integer and updating the value to be 10. In another example, the user may remove one or more lines like GUI line 426 and GUI line 428 by selecting the circled dash and confirming the removal of the line. In another embodiment, the user may select the file to be loaded for GUI line 430 by choosing the circled +.

In block 510 the auto-wrapper system 108 may create one or more indexes using the information received from a GUI received in block 508. The index is generated by the auto-wrapper system 108 analyzing the information received from a GUI and associating the parameter and option symbols with their associated content like type and description. The index may include choices, additions, changes, or modifications made with respect to GUI 400.

In block 512 the auto-wrapper system 108 may generate a parameter space module, such as module 210 which may include one or more parameters and options which are used in the list of user-curated command line patterns. The content for the parameters may be derived from the parameter's presence in the user-curated command line patterns in combination with the information received from a GUI.

In block 514 the auto-wrapper system 108 may transfer the parameter space to be data which is usable in the Analytics Workflow Service. The parameter space may be transferred as a wrapper function. A wrapper function may include any layer of abstraction which is wrapped around a piece of functionality or data. The wrapper function may be used by Analytics Workflow Service to be executed locally or on the cloud.

Figure 6:
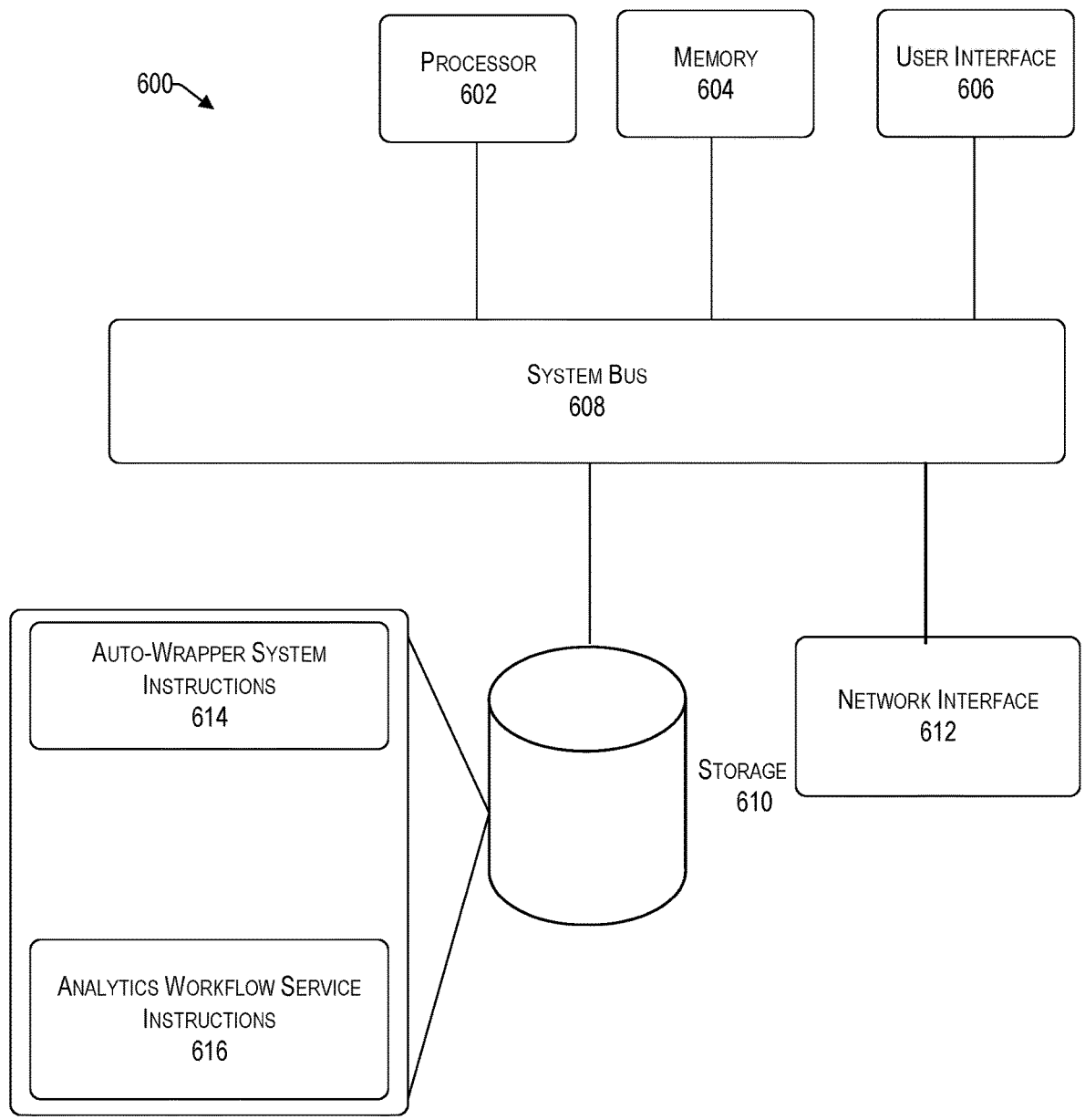
FIG. 6 is an example schematic diagram of a system according to an embodiment.

FIG. 6 is an example schematic diagram of a system 600 according to an embodiment. The system 600 includes a processing circuitry 602 coupled to a memory 604, a storage 610, a User Interface 606 (or GUI), and a network interface 612. In an embodiment, the components of the system 600 may be communicatively connected via a system bus 608.

The processing circuitry 602 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOC s), general-purpose microprocessors, microcontrollers, digital signal processors (DSPs), and the like, or any other hardware logic components that can perform calculations or other manipulations of information.

The memory 604 may be volatile (e.g., RAM, etc.), non-volatile (e.g., ROM, flash memory, etc.), or a combination thereof. In one configuration, computer readable instructions to implement one or more embodiments disclosed herein may be stored in the storage 610.

In another embodiment, the memory 604 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 602, cause the processing circuitry 602 to perform the various processes described herein. Specifically, the instructions, when executed, cause the processing circuitry 602 to receive information received from a GUI and user-curated command line patterns and automatically create a wrapper out of them.

The storage 610 may be a Solid-State Device (SSD), magnetic storage, optical storage, and the like, and may be realized, for example, as flash memory or other memory technology, CD-ROM, Digital Versatile Disks (DVDs), or any other medium which can be used to store the desired information. Storage 610 may store Auto-Wrapper System Instructions 614 which execute according to flow chart 500 as well as Analytics Workflow Service Instructions 616 which execute according to the appropriate Analytics Workflow Service as discussed. The network interface 612 allows the system 600 to communicate with the cloud server network for the purpose of, for example, receiving data, sending data, and the like.

It should be understood that the embodiments described herein are not limited to the specific architecture illustrated in FIG. 6, and other architectures may be equally used without departing from the scope of the disclosed embodiments.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method, comprising:
receiving, by an auto-wrapper system, information received from a graphical user interface (GUI) and a list of user-curated command line patterns, wherein the auto-wrapper system is associated with an analytics workflow service;
generating, by the auto-wrapper system, a module including a parameter space having one or more parameters and options used in the list of user-curated command line patterns, wherein a content for each parameter is derived from the parameter's presence in the list of user-curated command line patterns combined with the information received from the GUI; and
translating, by the auto-wrapper system, each command-line pattern of the list of user-curated command line patterns into an example snippet in a language of the analytics workflow service that invokes the module in such a way as to reproduce the command-line pattern.

2. The method of claim 1, further comprising:
receiving, by the analytics workflow service, a set of actual parameter values for an execution instance of the module;
generating, by the analytics workflow service, a command line in which the actual parameter values are incorporated using a format derived from the parameter space of the module; and
executing the generated command line.

3. The method of claim 1, wherein the content for each parameter includes a short tag, a display label, a description, an enrichment documentation, a type, an insertion pattern, a default value, and an optionality.

4. The method of claim 1, wherein:
the auto-wrapper system starts by parsing each command-line pattern of the list of user-curated command line patterns into a command with parameter, option, and value expressions; and
a set of results of parsing are modifiable by presentation via a graphical user-interface.

5. The method of claim 4, wherein:
the auto-wrapper system analyzes the information received from the GUI into an index associating parameter and/or option symbols with associated, content comprising type and description; and
an initial parsing of the list of user-curated command line patterns generates a set of information used to set parameters for analyzing the list of user-curated command line patterns.

6. The method of claim 5, wherein:
the auto-wrapper system resolves each parameter, option and value expression against the index; and
the resolving by the auto-wrapper system includes revising a parsing result from the set of results, by restructuring one expression, or combining two expressions into one, or splitting one expression into two expressions, according to what is found in the index.

7. A non-transitory computer readable storage medium tangibly embodying a computer readable program code having computer readable instructions that, when executed, causes a computer device to carry out a method comprising:
receiving, by an auto-wrapper system, information received from a graphical user interface (GUI) and a list of user-curated command line patterns, wherein the auto-wrapper system is associated with an analytics workflow service;
generating, by the auto-wrapper system, a module including a parameter space having one or more parameters and options used in the list of user-curated command line patterns, wherein content for each parameter is derived from the parameter's presence in the list of user-curated command line patterns combined with the information received from the GUI; and
translating, by the auto-wrapper system, each command-line pattern of the list of user-curated command line patterns into an example snippet in a language of the analytics workflow service that invokes the module in such a way as to reproduce the command-line pattern.

8. The non-transitory computer readable storage medium of claim 7, further comprising
receiving, by the analytics workflow service, a set of actual parameter values for an execution instance of the module;
generating, by the analytics workflow service, a command line in which the actual parameter values are incorporated using a format derived from the parameter space of the module; and
executing the generated command line.

9. The non-transitory computer readable storage medium of claim 7, wherein content for each parameter includes a short tag, a display label, a description, an enrichment documentation, a type, an insertion pattern, a default value, and an optionality.

10. The non-transitory computer readable storage medium of claim 7, wherein:
the auto-wrapper system starts by parsing each command-line pattern of the list of user-curated command line patterns into a command with parameter, option and value expressions; and
a set of results of parsing are modifiable by presentation via a graphical user-interface.

11. The non-transitory computer readable storage medium of claim 10, wherein:
the auto-wrapper system analyzes the information received from the GUI into an index associating parameter and/or option symbols with associated content, comprising like type and description; and
an initial parsing of the list of user-curated command line patterns generates a set of information used to set parameters for analyzing the list of user-curated command line patterns.

12. The non-transitory computer readable storage medium of claim 11, wherein:
the auto-wrapper system resolves each parameter, option and value expression against the index; and
the resolving, by the auto-wrapper system, includes revising a parsing result from the set of results by restructuring one expression, combining two expressions into one, or splitting one expression into two expressions, according to what is found in the index.

13. A computing device comprising:
a processor;
a network interface coupled to the processor to enable communication over a network;
a storage device coupled to the processor;
an auto-wrappering engine stored in the storage device, wherein an execution of the auto-wrappering engine by the processor configures the computing device to perform acts comprising:
receiving, by the computing device, information received from a graphical user interface (GUI) and a list of user-curated command line patterns, wherein the computing device is associated with an analytics workflow service;

generating, by the computing device, a module including a parameter space having one or more parameters and options used in the list of user-curated command line patterns, wherein content for each parameter is derived from the parameter's presence in the list of user-curated command line patterns combined with the information received from the GUI; and translating, by the computing device, each command-line pattern of the list of user-curated command line patterns into an example snippet in a language of the analytics workflow service that invokes the module in such a way as to reproduce the command-line pattern.

14. The computing device of claim 13, wherein the processor is further configured to perform acts comprising:

receiving, by the analytics workflow service, a set of actual parameter values for an execution instance of the module;

generating, by the analytics workflow service, a command line in which the actual parameter values are incorporated using a format derived from the parameter space of the module; and executing the command line which was generated.

15. The computing device of claim 13, wherein content for each parameter includes a short tag, a display label, a description, an enrichment documentation, a type, an insertion pattern, a default value, and an optionality.

16. The computing device of claim 13, wherein:

the computing device starts by parsing each command-line pattern of the list of user-curated command line patterns into a command with parameter, option and value expressions; and a set of results of parsing are modifiable by presentation via a graphical user-interface.

17. The computing device of claim 16, wherein:

the computing device analyzes the information received from the GUI into an index associating parameter and/or option symbols with associated content comprising a type and a description; and an initial parsing of the list of user-curated command line patterns generates a set of information used to set parameters for analyzing the list of user-curated command line patterns.

* * * * *